United States Patent [19]

Fukano et al.

[11] Patent Number: 5,774,453
[45] Date of Patent: Jun. 30, 1998

[54] INPUT/OUTPUT BUFFER TYPE ATM SWITCH

[75] Inventors: Maki Fukano; Tatsuo Nakagawa; Kenji Yamada, all of Tokyo, Japan

[73] Assignee: NEC Corporation, Tokyo, Japan

[21] Appl. No.: 633,214

[22] Filed: Apr. 16, 1996

[30] Foreign Application Priority Data

Apr. 18, 1995 [JP] Japan .................................... 7-092217

[51] Int. Cl.⁶ .................................................. H04L 12/56
[52] U.S. Cl. .......................... 370/231; 370/398; 370/414
[58] Field of Search ..................................... 370/230, 231, 370/232, 235, 236, 395, 398, 412, 413, 414, 428, 429

[56] References Cited

U.S. PATENT DOCUMENTS 5,457,687  10/1995  Newman ................................. 370/236
5,463,620  10/1995  Sriram .................................... 370/412
5,535,197  7/1996   Cotton .................................... 370/414
5,550,823  8/1996   Irie et al. ............................... 370/413
5,570,348  10/1996  Holden ................................... 370/414

*Primary Examiner*—Alpus H. Hsu
*Attorney, Agent, or Firm*—Young & Thompson

[57] ABSTRACT

The input/output buffer type ATM switch capable of traffic control depending on the traffic type at the time of cell congestion is provided. There are provided an input buffer memory and an output buffer memory for storing cells at each of a plurality of input ports and a plurality of output ports. Each of the input buffer memories is provided with queues corresponding to each of the output ports, logically independent for traffic types and sharing a memory area. Each of the output buffer memories is provided with queues logically independent for traffic types and sharing a memory area, and outputs an overflow signal corresponding to a remaining memory capacity against each of the input buffer memories. Cell transmission from the input buffer memories is controled in response to a remaining memory capacity and the traffic type indicated by the overflow signal.

4 Claims, 2 Drawing Sheets

INPUT/OUTPUT BUFFER TYPE ATM SWITCH

BACKGROUND OF THE INVENTION

1. Field of the Invention

This invention relates to an ATM (Asynchronous Transfer Mode) switch for distributing cells having arrived at a plurality of input ports to a plurality of output ports through an inner bus, and more particularly to the ATM switch provided with a traffic control system for performing a cell switching and distribution control in accordance with a degree of priority of cell and a congestion state of the system.

2. Description of the Related Art

There have been proposed and used several types of ATM switch in its configuration depending on the equipped position of buffers for storing ATM cells.

As one example of the ATM switch, there is an input buffer type ATM switch which is provided with buffers at each of the input ports. In the input buffer type ATM switch, it is controlled such that outputs of the cells arrived at each of the input ports are scheduled among each of the input ports to avoide collision of cells to be routed to the same outout port, and only one cell is allowed to arrives at the same output port in the same time.

This input buffer type ATM switch has a problem that a controlling for the scheduling of cell output among input ports becomes complex, and in the case of a broadcasting cell which is to be distributed to a plurality of output ports is handled, it may generate a problem that bands corresponding to the number of output ports for broadcasting destination are required for only one such broadcasting cell switching.

In turn, there is an output buffer type ATM switch which is provided with buffers at each of the output ports. The output buffer type ATM switch requires a high-speed memory as a buffer.

FIG. 2 is a block diagram showing a configuration of the output buffer type ATM switch.

In this figure, numeral 21 denotes an inner bus, numerals $22_1$ to $22_n$ denote input ports, numerals $23_1$ to $23_n$ denote output ports, numerals $24_1$ to $24_n$ denote transmitting circuits, numerals $25_1$ to $25_n$ denote receiving circuits, numerals $26_1$ to $26_n$ denote receiving buffers and numeral 27 denotes a switch control part.

Cells inputted from each of the input ports $22_1$ to $22_n$ to each of the transmitting circuits $24_1$ to $24_n$, respectively, are transmitted to the inner bus through transmitting circuits $24_1$ to $24_n$. A right of cell transmission from each of the transmitting circuits 241 to 24n to the inner bus is controlled by a switch control part 27. As a practical controlling method of the controlling part 27, it is possible to apply a method the right of cell transmission is given to each of the ports cyclically in a time-sharing basis or the like.

Each of the transmitting circuits $24_1$ to $24_n$ uses buffers with storage capacity for several cells and transmits a cell to the inner bus in response to the right of cell transmission signal from the switch control part 27. The cells multiplexed on the inner bus are checked at their header parts by the receiving circuits $25_1$ to $25_n$ of each of the ports, and only the cell of the corresponding output port is taken and received at the receiving buffers $26_1$ to $26_n$.

In the output buffer type ATM switch, the throughputs of the inner bus 21 are larger than a total value of throughputs of each of the input ports. In this case, if it is assumed that data transmission rates at each of the input ports $22_1$ to $22_n$ and each of the output ports $23_1$ to $23_n$ are defined by m bit/sec, there are throughputs of the inner bus 21 by more than n x m bit/sec. Accordingly, in view of each of the input ports, even if the cells arrive at continuously, it is possible to transmit one cell to the inner bus within a period in which one cell arrives at the port, so that it is sufficient for the input port to have a buffer with storage capacity for several cells as timing adjustment buffer. That is, neither of cell congestion nor cell discard occurs at the input ports (an time interval of the cell arrival at input port at the maximum data transmission rate of the circuit is called as "one cell period" hereinafter).

In turn, there is a possibility that cells are discarded at the output ports due to cell congestion. For example, in the case that the cells to be routed to a specified output port arrive concurrently from a plurality of input ports, in other words, a plurality of cells reach the specified output port within the one cell period. In this case, only one cell is outputted from the receiving buffer within the one cell period, so that the number of input cells increase and the cells are gradually accumulated in the receiving buffer and finally the buffer over-flow occurs to cause the cells to be discarded.

In addition, in the case that a data transmission rate at output side is lower than that of output port of the switch, there is a possibility that the cells are frequently discarded.

As described above, since there is a possibility that cell congestion may occur at the output ports, the receiving buffers $26_1$ to $26_n$ must have a sufficient large capacity. However, as apparent from the foregoing description, since the receiving buffers $26_1$ to $26_n$ take cells inputted at a data transmission rate of the inner bus 21, a data writing must be enabled to be performed at a rate of n x m bit/sec (i.e. a multiplication of m of the data transmission rate at input port). In the case of the switch having a large capacity in which n x m bit/sec becomes several Gbps to several tens Gbps, the data transmission rate is so high speed rate, so that it can not use a memory externally provided, and in turn, in the current LSI technology, it is difficult in view of its size to provide a high speed rate memory having a large capacity in it.

As a system for supplementing the problems of the input buffer type ATM switch and the output buffer type ATM switch, it may be considered to provide an input/output buffer type ATM switch in which buffers are arranged at both input and output ports. The input/output buffer type ATM switch is constructed such that buffers with large capacity are added to the input ports of the output buffer type ATM switch. Since it is satisfactory that the buffers to be added to the input ports can perform reading and writing of cells at a speed rate of port data transmission rate m bit/sec, it is possible to apply the external memory and then a buffer with large capacity can be attained.

When a receiving buffer is apt to overflow, RNR (Receive Not Ready) signal is outputted to each of the input buffers from the receiving buffer. At the input buffers, outputs of the cells to be routed to the output port, which the RNR signal is being outputted from the corresponding receiving buffer, is stopped, and as the result, inputting of the cells to the receiving buffer is temporarily stopped to eliminate the congestion.

In the aforesaid input/output buffer type ATM switch, the input buffers must be independently provided for each of the output ports to enable to read out cells for each of the output ports. If a buffer such as FIFO having one queue configuration is used as the input buffer and when the cell for the specified output port from which the RNR signal is transmitted come to a head of the queue, cells for other output ports having no congestion can not be outputted (such a phenomenon is called as "a head-of-line").

For example of countermeasures of this type of problem, it may be considered to provide an independent logical queue corresponding to each output port by a memory capable of performing a random writing/reading for the input buffer. In the case of the input/output buffer type AMR switch described above, the cell discard at the receiving buffers is prevented from being occurred by adding the input buffer, and the input buffer can use necessary capacity of external memory, so that the problem of cell discarding can be apparently resolved.

However, information carried by the ATM communication contain data having an real time characteristic such as acoustic sound of telephone and animation and the like. Communication requiring the real time characteristic is insufficient only by preventing the discard of cells and its delay time must be kept within a specified value. In the ATM communication, a traffic type of communication requiring the real time characteristic is to be specified in advance to the time of the connection being set up to discriminate from the traffic of other data and to enable to process under a high priority. In the aforesaid input/output buffer type ATM switch described above, the real time traffic of the high priority, which is not allowing its delay (hereinafter called as "CBR"=Constant Bit Rate traffic), as well as the traffic of low priority are stopped similarly when a receiving buffer is congested, and as the result, the independent delay control for every priority traffic can not be carried out.

The input buffer type ATM switch in the aforesaid conventional ATM switch shows a complex control of scheduling the right of cell transmission among each of input ports, and for the broadcasting cell, it shows a problem that the bands corresponding to the number of its destination output ports are occupied.

The output buffer type ATM switch shows a problem that cells are discarded at the output ports under congestion state.

The input/output buffer type ATM switch shows a problem that even though the cell discard can be prevented, but when a receiving buffer is under congestion, the high priority traffic, which is not allowing a delay, is similarly stopped in the same manner as that of the low priority traffic.

The present invention has been completed in view of the problems described above, and it is an object of the present invention to realize the ATM switch capable of satisfying delay characteristic of the CBR traffic by preventing the discard of cells and performing congestion control for each of the traffic types.

SUMMARY OF THE INVENTION

The present invention provides an ATM switch in which there are provided an input buffer memory and an output buffer memory for storing cells at each of a plurality of input ports and a plurality of output ports, and the cells arrived at each of input ports are switched and distributed to the output ports by a main body of the switch arranged between each of the input ports, and the ATM switch comprises the following components:

(1) an output buffer means corresponding to each of the output port for storing cells to be outputted to the output port, and this output buffer means comprises;
   a. a first logical queue containing a plurality of first priority queues for storing cells depending on traffic priority indicated by the cell inputted to the output buffer means;
   b. an idle queue for supervising remaining capacity to be used of the first logical queue, and for generating a plurality of overflow signals corresponding to a plurality of predetermined threshold values of remaining capacity depending on defining congestion states of the output buffer means, each of the overflow signals containing discriminating information of the output buffer means as origin of the overflow signal being generated;

(2) an input buffer means corresponding to each of the input port for storing cells to be outputted to the main body of the switch, and this input buffer means comprises;
   a. a plurality of second logical queues, each corresponding to each of the output ports, and each containing a plurality of second priority queues for storing cells depending on traffic priority indicated by the cell inputted to the input buffer means;
   b. a control means for stopping cell output from the second priority queues, having predetermined traffic priority corresponding to the congestion state represented by the overflow signal being received, corresponding to the output buffer means generating the overflow signal, unless otherwise other higher second priority queues contain no cell to be outputted.

An ATM switch in accordance with the second embodiment of the present invention provides an ATM switch in which there are provided an input buffer memory and an output buffer memory for storing cells at each of a plurality of input ports and a plurality of output ports, and the cells arrived at each of input ports are switched and distributed to the output ports by a main body of the switch arranged between each of the input ports, and the ATM switch comprises the following components:

(1) an output buffer means corresponding to each of the output port for storing cells to be outputted to the output port, and this output buffer means comprises;
   a. a first logical queue containing a couple of first priority queues for storing cells depending on traffic priority indicated by the cell inputted to the output buffer means;
   b. an idle queue for supervising remaining capacity to be used of the first logical queue, and for generating a first overflow signal corresponding to a first predetermined threshold value of remaining capacity, the first overflow signal containing discriminating information of the output buffer means as origin of the first overflow signal being generated; and (2) an input buffer means corresponding to each of the input port for storing cells to be outputted, and this input buffer means comprises;
   a. a plurality of second logical queues, each corresponding to each of the output ports, and each containing a couple of second priority queues for storing cells depending on traffic priority indicated by the cell inputted to the input buffer means; and
   b. a control means for stopping cell output from one of the second priority queues, having lower traffic priority, corresponding to the output buffer means generating the first overflow signal unless otherwise another second priority queue, having higher traffic priority, contain no cell to be outputted.

Also in this case, a main body of the switch has a plurality of receiving buffers for temporarily storing cells transmitted from the input buffer means and distributing them to the output buffer means;

each of the output buffer means outputs the second overflow signal to the main body of the switch when the remaining memory capacity becomes almost empty; and the main body of the switch, when it receives the second overflow signal, stops the distribution of the cells against the output buffer means outputting the second overflow signal.

Each of receiving buffer means outputs a third overflow signal to each of input buffer means when the remaining memory capacity becomes a predetermined threshold value; and each of the input buffer means, when it receives the third overflow signal, stops a transmitting of cells against the receiving buffer means outputting the third overflow signal.

In accordance with the present invention constructed as described above, in the case that the traffics are congested at the output side of the switch, an overflow signal (a first overflow signal) is outputted and correspondingly an output from the queue corresponding to the traffic type having a low priority is stopped. In this way, it becomes possible to perform a controlling operation under a plurality of steps in response to the priority while the switching of all the cells corresponding to the output port congested is not stopped once.

That is, the cell having a high priority against the delay can be switched by stopping the traffic having a low priority when the congestion state occurs.

In addition, the present invention is effective in the case that the congestion state is occurred due to the fact that the data transmission rate in the output circuit is lower than the rate of output port at the switch or in the case that the outputs of the output ports in the switch are branched into a plurality of output circuits and some of the plurality of output circuits are congested. In such a case as above, the second threshold value is determined in such a way that the second overflow signal may be outputted, thereby the output of cells from the input port can be stopped and the cell discard can be prevented.

In addition, in the case that the traffic having a data transmission rate more than that of the output ports of the switch are concentrated continuously at the specified output port, the output of cell from the input ports is stopped by defining the third threshold value in such a way that the receiving buffer memory in the switch may output the overflow signal. In this case, the cell for the receiving buffer being congested is stopped with RNR caused by the threshold value of the receiving buffer within the switch described in the item of the Prior Art without having any relation to the priority and then a control of the priority may not be attained.

DETAILED DESCRIPTION OF THE PREFERRED EMBODIMENTS

Figure 1:
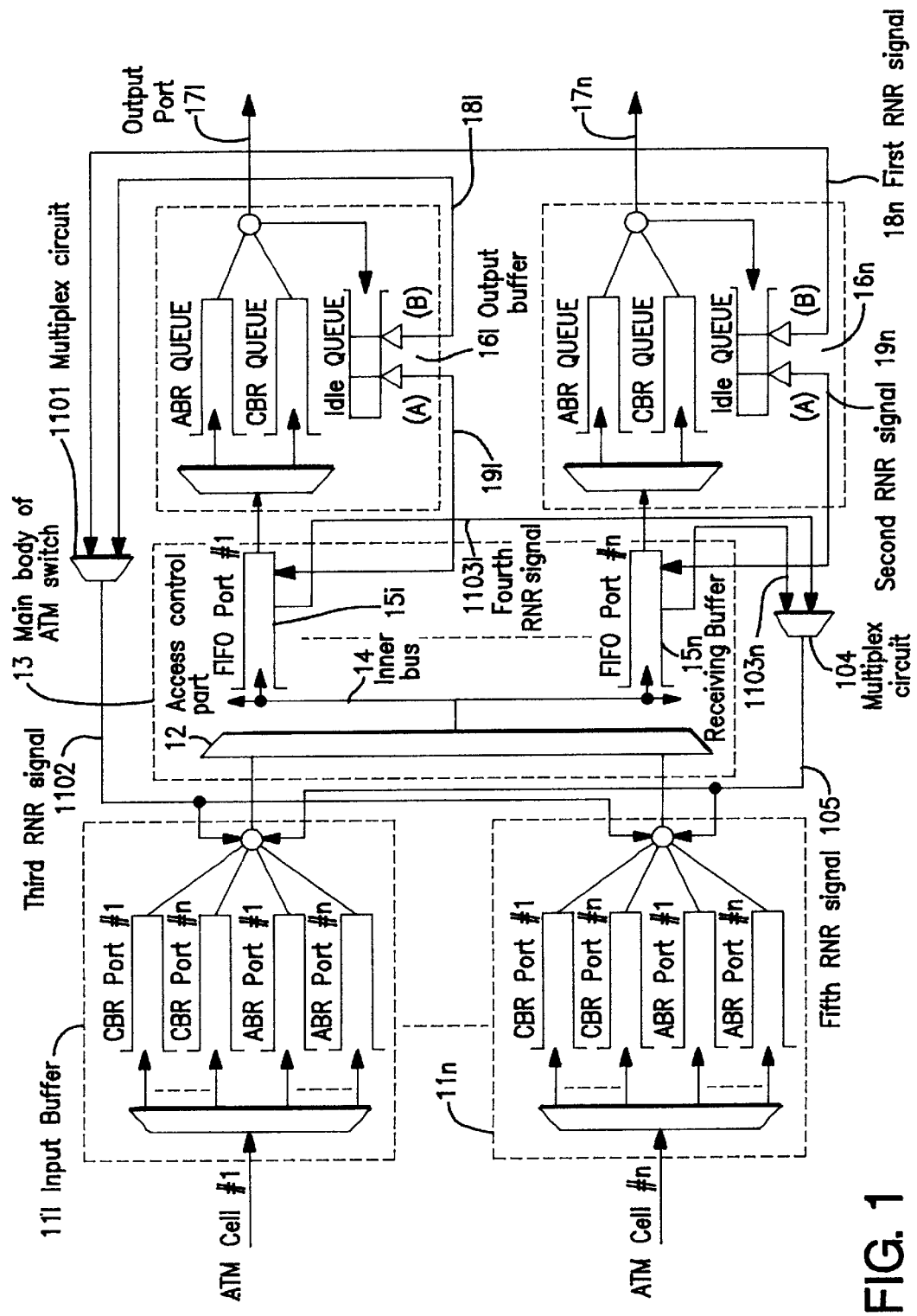
FIG. 1 is a block diagram of an input/output buffer type ATM switch as one preferred embodiment of the present invention for realizing a traffic control.
Figure 2:
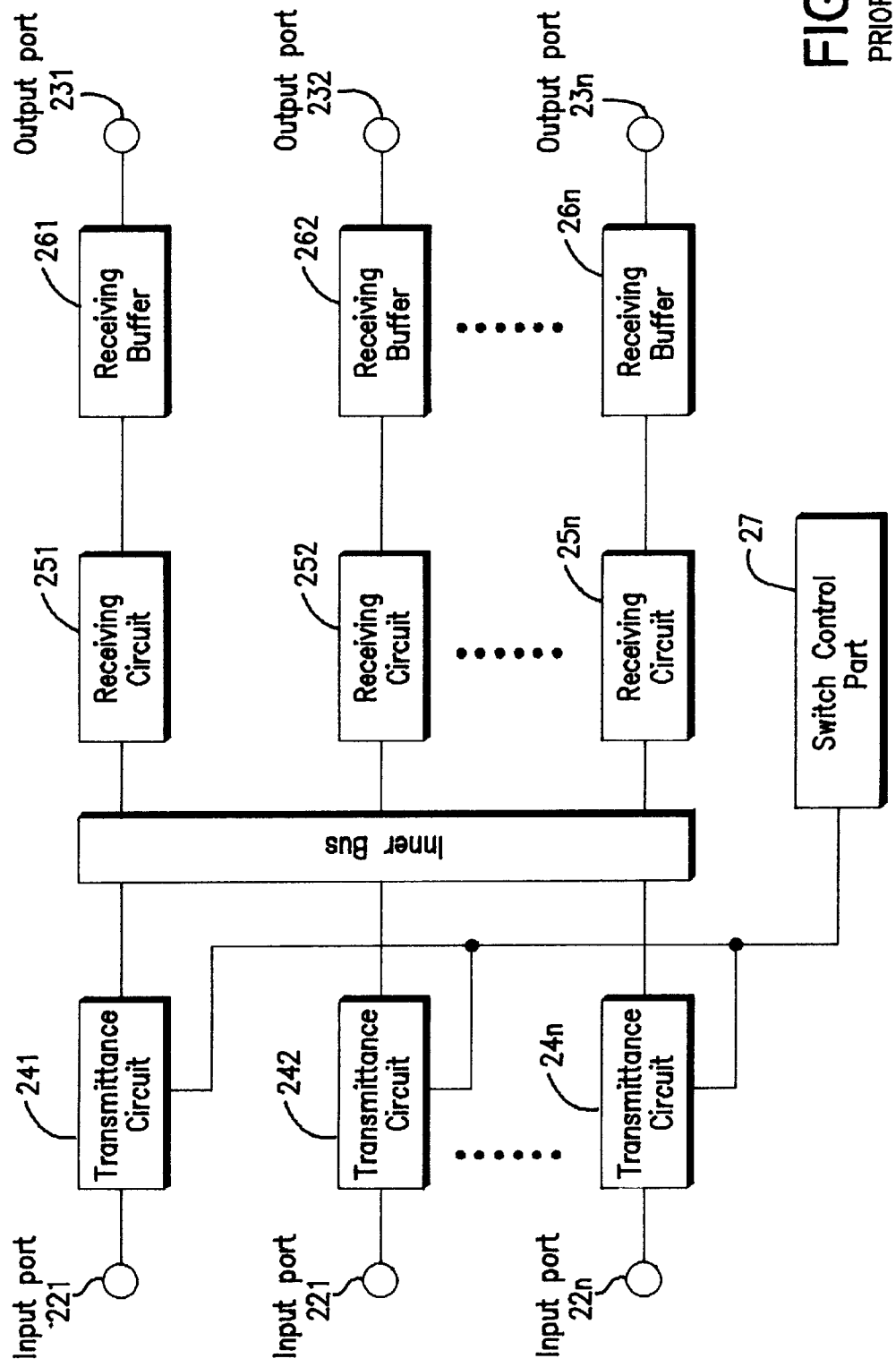
FIG. 2 is a block diagram of conventional output buffer type ATM switch.

Referring now to the drawings, one preferred embodiment of the present invention will be described as follows.

FIG. 1 is a block diagram showing a configuration of one preferred embodiment of the ATM switch including the traffic control function.

In FIG. 1, numerals $11_l$ to $11_n$ denote input buffers; numeral 13 a main body of the ATM switch; numeral 12 an access control part within the main body 13 of the ATM switch; numeral 14 an inner bus; numerals $15_l$ to $15_n$ receiving buffers within the main body of the ATM switch; numerals $16_l$ to $16_n$ output buffers; numerals $17_l$ to $17_n$ output ports of the swith; numerals $18_l$ to $18_n$ first RNR signals (first overflow signals); numerals $19l$ to $19n$ second RNR signals (second overflow signals); numeral 1101 a multiplex circuit; numeral 1102 a third RNR signal; numerals $1103_l$ to $1103_n$ fourth RNR signals (third overflow signals); numeral 1104 a multiplex circuit; and 1105 a fifth RNR signal, respectively.

Input buffers $11_l$ to $11_n$ are provided for each of the input ports. Each of the input buffers $11_l$ to $11_n$ is composed of a random access memory, and has logical queues of each of the number of output ports x two pieces in it.

Each of the logical queues is comprised of two queues for two traffic types of a CBR of high priority and an ABR (Available Bit Rate) of low priority for each of the output ports. Each of the logical queues shares an entire memory areas and so it is not necessary to assign specific area to each of the logical queues in a fixed manner.

The cells stored in each of the queues in input buffers are inputted in sequence into the inner bus 14 through the access control part 12 for each of the output ports, and outputted to the predetermined address port. The queue of the CBR has a higher priority than another queue of the ABR for the same output port in the same input buffer. Therefore, as far as a cell is stored in the queue of the CBR, cell is always outputted from the queue of the CBR, and cell in the queue of low priority is outputted only the case where no cell exists in the queue of the CBR.

The access control part 12 is a circuit for performing an access control of cells from each of the input buffers to the inner bus and as already described in the item of the Related Art above, this may be a controlling circuit in which the right of cell transmission is simply given in sequence for each of the input ports. The inner bus 14 is a time sharing bus, wherein as already described in the item of the Related Art, it has a data transmission rate of n-times of that of each of the input ports, so that it is guaranteed that the cells can be transmitted from each of the input ports one by one within a one cell period.

The receiving buffers $15_l$ to $15_n$ are arranged for each of the output ports, and as already described in the item of the Related Art, each of the receiving buffers $15_l$ to $15_n$ is a memory operated at the data transmission rate of the inner bus and their memory capacities are generally quite low as compared with those of the output buffers $16_l$ to $16_n$.

The output buffers $16_l$ to $16_n$ are composed of random access memories in the same manner as that of the input buffers $11_l$ to $11_n$, and they have two logical queues for CBR (high priority) and for ABR (low priority). Each of the logical queues shares a memory areas of an entire output buffer and so it is not necessary to assign specific memory area for each of the logical queues.

A capacity of vacant areas in each of the output buffers $16_l$ to $16_n$ is detected in sequence. In order to indicate a size of the vacant area, an idle queue is logicaly defined. A size of the idle queue indicates a capacity of a vacant buffer area at that time, and for example, the length =0 of the idle queue indicates that all the buffer areas are used.

Two threshold values, the second threshold value (A) and the first threshold value (B), are provided in each of the idle queues, and at the time when the length of the idle queue becomes short and is reached to the first threshold value (B), the first RNR signals $18_l$ to $18_n$ are generated.

The first RNR signals $18_l$ to $18_n$ generated from each of the output buffers $16_l$ to $16_n$ are multiplexed by the multiplex circuit 1101 so as to produce the third RNR signal 1102 and this signal is inputted to each of the input buffers $11_1$ to $11_n$.

The aforesaid third RNR signal 1102 contains discriminating number of the output buffers $16_1$ to $16_n$ generating the first RNR signal, each of the input buffers $11_1$ to $11_n$ receiving the third RNR signal 1102 stops the cell output from the low priority queue of ABR corresponding to the output buffer generating the first RNR signal until disappearing the first RNR signal from the output buffer. Even during this period, the cell output from the queue of CBR having a high priority is allowed and then the traffic control for a respective priority which is an object of the present invention can be achieved.

The second threshold value (A) is set to a lower value than the first threshold value (B), and when a length of the idle queue is becoming shorter and reach to the second threshold value (A), the second RNR signals $19_1$ to $19_n$ are generated and inputted to each of the receiving buffers $15_1$ to $15_n$ respectively corresponding to the output buffer generating the second RNR signal.

The second threshold value (A) is set such that the remaining capacity of the output buffer is scarcely present, and so the receiving buffer which has received the second RNR signal stops a cell output to the corresponding output buffer. At this time, cell transmission of any priority is stopped.

The receiving buffers $15_1$ to $15_n$ are also provided with each threshold value to control cell transmission, and when the cell amount stored in each of the receiving buffers $15_1$ to $15_n$ exceeds this threshold value, the fourth RNR signal $1103_1$ to $1103_n$ is generated and inputted to the multiplex circuit 1104. The multiplex circuit 1104 generates a fifth RNR signal 1105 including a discriminating number of the output buffer corresponding to the receiving buffer generating the fourth RNR signal in the same manner as that of the first RNR signal 1101 and the third RNR signal 1102, and inputs it in each of the input buffers $11_1$ to $11_n$. Each of the input buffers $11_1$ to $11_n$ stops an outputting of cells for the output port corresponding to the output buffer indicated in the fifth RNR signal being received. In this case, outputting cell from both of two logical queues of CBR for high priority and of ABR for low priority is stopped.

In the aforesaid preferred embodiment, it has been described that each of the output buffers $16_1$ to $16_n$ performs a comparison between the first threshold value (B) and the second threshold value (A), the first RNR signals $18_1$ to $18_n$ and the second RNR signals $19_1$ to $19_n$ are outputted and each of the input buffers $11_1$ to $11_n$ determines a stopping cell output from queue. However, it may be formed such that the more threshold values can be set to output more RNR signals and each of the input buffers $11_1$ to $11_n$ determines the queue to be outputted in response to each of the RNR signals from the priority of the type of traffic. With such an arrangement as above, it is possible to set the order of priority for the traffic of VBR (Variable Bit Rate).

Although the present invention has been fully described by way of the preferred embodiments thereof with reference to the accompanying drawings, various changes and modifications will be apparent to those having skill in this field. Therefore, unless these changes and modifications otherwise depart from the scope of the present invention, they should be construed as included therein.

What is claimed:

1. An ATM switch having an input buffer memory and an output buffer memory for storing cells at each of a plurality of input ports and a plurality of output ports, and the cells inputted from each of input ports being switched and distributed to the output ports by a main body of the switch arranged between each of the input ports and each of the output ports, said ATM switch comprising:

an output buffer means corresponding to each of the output port for storing cells to be outputted to the output port comprising;
   a first logical queue containing a plurality of first: priority queues for storing cells depending on traffic priority indicated by the cell inputted to the output buffer means;
   an idle queue for supervising remaining capacity to be used of the first logical queue, and for generating a plurality of overflow signals corresponding to a plurality of predetermined threshold values of remaining capacity depending on defining congestion states of the output buffer means, each of the overflow signals containing discriminating information of the output buffer means as origin of the overflow signal being generated;

an input buffer means corresponding to each of the input port for storing cells to be outputted to the main body of the switch comprising;
   a plurality of second logical queues, each corresponding to each of the output ports, and each containing a plurality of second priority queues for storing cells depending on traffic priority indicated by the cell inputted to the input buffer means;
   a control means for stopping cell output from the second priority queues, having predetermined traffic priority corresponding to the congestion state represented by the overflow signal being received, corresponding to the output buffer means generating the overflow signal, unless otherwise other higher second priority queues contain no cell to be outputted.

2. An ATM switch having an input buffer memory and an output buffer memory for storing cells at each of a plurality of input ports and a plurality of output ports, and the cells inputted from each of input ports being switched and distributed to the output ports by a main body of the switch arranged between each of the input ports and each of the output ports, said ATM switch comprising:

an output buffer means corresponding to each of the output port for storing cells to be outputted to the output port comprising;
   a first logical queue containing a couple of first priority queues for storing cells depending on traffic priority indicated by the cell inputted to the output buffer means;
   an idle queue for supervising remaining capacity to be used of the first logical queue, and for generating a first overflow signal corresponding to a first predetermined threshold value of remaining capacity, the first overflow signal containing discriminating information of the output buffer means as origin of the first overflow signal being generated; and an input buffer means corresponding to each of the input port for storing cells to be outputted comprising;
   a plurality of second logical queues, each corresponding to each of the output ports, and each containing a couple of second priority queues for storing cells depending on traffic priority indicated by the cell inputted to the input buffer means; and
   a control means for stopping cell output from one of the second priority queues, having lower traffic priority, corresponding to the output buffer means generating the first overflow signal unless otherwise another second priority queue, having higher traffic priority, contain no cell to be outputted.

3. An ATM switch according to claim 2, wherein the idle queue further generating a second overflow signal in an event of almost empty state of the idle queue, said ATM switch further comprising:

a plurality of receiving buffer means being provided in the main body of the switch, each corresponding to each of the output buffer means, for temporarily storing cells to be outputted to the output buffer means, and stopping cell output when reciving the second overflow signal from the corresponding output buffer means.

4. An ATM switch according to claim 3, further characterized in that:

each of receiving buffer means outputs a third overflow signal to each of input buffer means when the remaining buffer capacity of the receiving buffer means becomes a predetermined threshold value; and each of the input buffer means, when receiving the third overflow signal, stops cell outputting from both of the second priority queues corresponding to the output port for the receiving buffer means outputting the third overflow signal.

\* \* \* \* \*